United States Patent
Fowe

(10) Patent No.: US 10,775,187 B2
(45) Date of Patent: Sep. 15, 2020

(54) METHOD, APPARATUS, AND COMPUTER PROGRAM PRODUCT FOR DETERMINING LANE LEVEL TRAFFIC INFORMATION

(71) Applicant: HERE Global B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 232 days.

(21) Appl. No.: 16/042,640

(22) Filed: Jul. 23, 2018

(65) Prior Publication Data

US 2020/0025584 A1 Jan. 23, 2020

(51) Int. Cl.
| | | |
|---|---|---|
| *G01C 21/34* | (2006.01) | |
| *G08G 1/056* | (2006.01) | |
| *G08G 1/01* | (2006.01) | |
| *G01C 21/28* | (2006.01) | |
| *G01C 21/36* | (2006.01) | |

(52) U.S. Cl.
CPC ......... *G01C 21/3492* (2013.01); *G01C 21/28* (2013.01); *G01C 21/3415* (2013.01); *G01C 21/3446* (2013.01); *G01C 21/3694* (2013.01); *G08G 1/0145* (2013.01); *G08G 1/056* (2013.01)

(58) Field of Classification Search
CPC .............. G01C 21/3492; G01C 21/28; G01C 21/3415; G01C 21/3446; G01C 21/3694; G08G 1/0145; G08G 1/056
See application file for complete search history.

(56) References Cited

U.S. PATENT DOCUMENTS

| | | | |
|---|---|---|---|
| 9,008,954 B2 | 4/2015 | Miller et al. | |
| 9,640,071 B2 | 5/2017 | Fowe et al. | |
| 9,672,734 B1* | 6/2017 | Ratnasingam | G08G 1/0145 |
| 9,928,743 B2 | 3/2018 | Eilertsen | |
| 2014/0149029 A1 | 5/2014 | Sakakibara et al. | |
| 2014/0278052 A1* | 9/2014 | Slavin | G08G 1/0145 |
| | | | 701/400 |
| 2019/0310100 A1* | 10/2019 | Yang | G08G 1/0129 |

OTHER PUBLICATIONS

Ramezani, M. et al., *Queue Profile Estimation in Congested Urban Networks With Probe Data*, Computer-Aided Civil and Infrastructure Engineering 00 (2014) 1-19.

* cited by examiner

*Primary Examiner* — Aaron L Troost
(74) *Attorney, Agent, or Firm* — Alston & Bird LLP

(57) ABSTRACT

A method, apparatus and computer program product are provided for establishing direction based traffic events and lane-level traffic associated therewith. Methods may include receiving a plurality of probe data points, where each probe data point includes location information associated with the respective probe apparatus; determining a path through an intersection from among a plurality of paths through the intersection for each probe apparatus based, at least in part, on a sequence of probe data points from each respective probe apparatus; determining, for each path through the intersection, an average speed of probe apparatuses traveling along the respective path and an average travel time along a road link approaching the intersection of the probe apparatuses traveling along the respective path; and determining a direction based traffic event in response to the differential amount of time between the highest average travel time and the lowest average travel time.

20 Claims, 11 Drawing Sheets

FIG. 8

METHOD, APPARATUS, AND COMPUTER PROGRAM PRODUCT FOR DETERMINING LANE LEVEL TRAFFIC INFORMATION

TECHNOLOGICAL FIELD

An example embodiment of the present invention relates to determining lane level traffic information, and more particularly, to the dynamic aggregation of road segments or links according to lane level traffic speeds to provide improved traffic congestion feedback.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Traffic data that is provided on digital maps is generally based on crowd-sourced data from mobile devices or probe data. The traffic data is typically reflective of a collective group of mobile devices traveling along a road segment, and may be useful in vehicle navigation applications in order for a user to avoid heavy traffic routes between an origin and a destination. However, dynamic computation of route optimization is computationally intensive and limited based on available processing power and the resultant periodic updates that can be processed.

BRIEF SUMMARY

A method, apparatus, and computer program product are provided in accordance with an example embodiment for establishing a direction based traffic event at an intersection based on a plurality of paths through the intersection. Embodiments described herein provide a mapping system including a memory having map data stored thereon and processing circuitry. The processing circuitry may be configured to: receive a plurality of probe data points, each probe data point received from a probe apparatus of a plurality of probe apparatuses, each probe apparatus including one or more sensors and being onboard a respective vehicle, where each probe data point includes location information associated with the respective probe apparatus; determine a path through an intersection from among a plurality of paths through the intersection for each probe apparatus based, at least in part, on a sequence of probe data points from each respective probe apparatus; determine, for each path through the intersection, an average speed of probe apparatuses traveling along the respective path and an average travel time along a road link approaching the intersection of the probe apparatuses traveling along the respective path; calculate a differential amount of time between a highest average travel time along the road link approaching the intersection corresponding to a first path and a lowest average travel time along the road link approaching the intersection corresponding to a second path; determine a direction based traffic event in response to the differential amount of time between the highest average travel time and the lowest average travel time; publish the direction based traffic event with lane-level traffic to users of the mapping system; and provide route guidance relative to the intersection based on the lane-level traffic of the plurality of paths through the intersection.

According to some embodiments, the processing circuitry configured to determine a direction based traffic event in response to the differential amount of time between the highest average travel time and the lowest average travel time may include processing circuitry configured to determine a direction based traffic event in response to the differential amount of time between the highest average travel time and the lowest average travel time satisfying a predetermined value. The processing circuitry may optionally be configured to: receive a plurality of probe data points corresponding to a first road link upstream of the road link approaching the intersection; process the probe data points corresponding to the first road link upstream of the road link approaching the intersection using a multi-modality detection and clustering algorithm to establish if multi-modality is present; and, in response to multi-modality being present, calculate a number of modes present and a speed ratio between a mode having the lowest average speed and a mode having the highest average speed. In response to the number of modes present corresponding to a number of modes in the probe data points along the road link approaching the intersection and the speed ratio satisfying a predetermined criteria, grouping the first road link upstream of the road link approaching the intersection with the road link approaching the intersection into a direction based traffic segment where lane-level traffic along the direction based traffic segment is estimated to be consistent.

According to some embodiments, the processing circuitry may optionally be configured to: receive a plurality of probe data points corresponding to a second road link upstream of the first road link upstream of the road link approaching the intersection; process the probe data points corresponding to the second road link upstream of the first road link using a multi-modality detection and clustering algorithm to establish if multi-modality is present; and, in response to multi-modality being present, calculate a number of modes present and a speed ratio between a mode having the lowest average speed and a mode having the highest average speed. In response to the number of modes present corresponding to the number of modes present in the second road link corresponding to the number of modes in the probe data points along the road link approaching the intersection and the speed ratio of the second road link satisfying the predetermined criteria, grouping the second road link upstream of the first road link upstream of the road link approaching the intersection with the first road link upstream of the road link approaching the intersection and the road link approaching the intersection into the direction based traffic segment.

The processing circuitry configured to provide route guidance relative to the intersection based on the lane-level traffic of the plurality of paths through the intersection may include providing route guidance along a first route to a destination. The processing circuitry may optionally be configured to: cause a route guidance change from a first path through the intersection of the first route to a second path through the intersection in response to an amount of time saved following the second path through the intersection relative to the first path through the intersection satisfying a predetermined amount of time; and recalculate the route to the destination incorporating the second path through the intersection.

Embodiments described herein may provide an apparatus including at least one processor and at least one memory including computer program code. The at least one memory and the computer program code are configured to, with the processor, cause the apparatus to: receive a plurality of probe data points, each probe data point received from a probe apparatus of a plurality of probe apparatuses, each probe apparatus including one or more sensors and being onboard a respective vehicle, where each probe data point includes location information associated with the respective probe apparatus; determine a path through the intersection from among a plurality of paths through the intersection for each probe apparatus based, at least in part, on a sequence of probe data points from each respective probe apparatus; determine, for each path through the intersection, an average speed of probe apparatuses traveling along the respective path and an average travel time along a road link approaching the intersection of the probe apparatuses traveling along the respective path; calculate a differential amount of time between a highest average travel time along the road link approaching the intersection corresponding to a first path and a lowest average travel time along the road link approaching the intersection corresponding to a second path; determine a direction based traffic event in response to the differential amount of time between the highest average travel time and the lowest average travel time; publish the direction based traffic event with lane-level traffic to users; and provide route guidance relative to the intersection based on the lane-level traffic of the plurality of paths through the intersection.

According to some embodiments, causing the apparatus to determine a direction based traffic event in response to the differential amount of time between the highest average travel time and the lowest average travel time may include causing the apparatus to determine a direction based traffic event in response to the differential amount of time between the highest average travel time and the lowest average travel time satisfying a predetermined value. The apparatus may optionally be caused to: receive a plurality of probe data points corresponding to a first road link upstream of the road link approaching the intersection; process the probe data points corresponding to the first road link upstream of the road link approaching the intersection using a multi-modality detection and clustering algorithm to establish if multi-modality is present; and, in response to multi-modality being present, calculate a number of modes present and a speed ratio between a mode having the lowest average speed and a mode having the highest average speed. In response to the number of modes present corresponding to a number of modes in the probe data points along the road link approaching the intersection, and the speed ratio satisfying a predetermined criteria, grouping the first road link upstream of the road link approaching the intersection with the road link approaching the intersection into a direction based traffic segment where lane-level traffic along the direction based traffic segment is estimated to be consistent.

According to some embodiments, the apparatus may be caused to: receive a plurality of probe data points corresponding to a second road link upstream of the first road link upstream of the road link approaching the intersection; process the probe data points corresponding to the second road link upstream of the first road link using a multi-modality and clustering algorithm to establish if multi-modality is present; and in response to multi-modality being present, calculate a number of modes present and a ratio between a mode having the lowest average speed and a mode having the highest average speed of the second road link. In response to the number of modes present in the second road link corresponding to the number of modes present in the probe data points along the road link approaching the intersection and the speed ratio of the second road link satisfying the predetermined criteria, grouping the second road link upstream of the first road link upstream of the road link approaching the intersection with the first road link upstream of the road link approaching the intersection and the road link approaching the intersection into the direction based traffic segment.

Causing the apparatus to provide route guidance relative to the intersection based on the lane-level traffic of the plurality of paths through the intersection may include providing route guidance along a first route to a destination, the apparatus may optionally be caused to: cause a route guidance change from the first path through the intersection of the first route to the second path through the intersection in response to an amount of time saved following the second path through the intersection relative to the first path through the intersection satisfying a predetermined amount of time; and recalculate the route to the destination incorporating the second path through the intersection.

Embodiments provided herein may include a method. The method may include: receiving a plurality of probe data points, each probe data point received from a probe apparatus of a plurality of probe apparatuses, each probe apparatus including one or more sensors and being onboard a respective vehicle, where each probe data point includes location information associated with the respective probe apparatus; determining a path through an intersection from among a plurality of paths through the intersection for each probe apparatus based, at least in part, on a sequence of probe data points from each respective probe apparatus; determining, for each path through the intersection, an average speed of probe apparatuses traveling along the respective path and an average travel time along a road link approaching the intersection of the probe apparatuses traveling along the respective path; calculating a differential amount of time between a highest average travel time along the road link approaching the intersection corresponding to a first path and a lowest average travel time along the road link approaching the intersection corresponding to a second path; determining a direction based traffic event in response to the differential amount of time between the highest average travel time and the lowest average travel time; publishing the direction based traffic event with lane-level traffic to users; and providing route guidance relative to the intersection based on the lane-level traffic of the plurality of paths through the intersection.

Determining a direction based traffic event in response to the differential amount of time between the highest average travel time and the lowest average travel time may include determining a direction based traffic event in response to the differential amount of time between the highest average travel time and the lowest average travel time satisfying a predetermined value. Methods may optionally include: receiving a plurality of probe data points corresponding to a first road link upstream of the road link approaching the intersection; processing the probe data points corresponding to the first road link upstream of the road link approaching the intersection using a multi-modality detection and clustering algorithm to establish if multi-modality is present; and in response to multi-modality being present, calculating a number of modes present and a speed ratio between a mode having the lowest average speed and a mode having the highest average speed. In response to the number of modes present corresponding to a number of modes in the probe data points along the road link approaching the intersection and the speed ratio satisfying a predetermined criteria, grouping the first road link upstream of the road link approaching the intersection with the road link approaching the intersection into a direction based traffic segment where lane-level traffic along the direction based traffic segment is estimated to be consistent.

According to some embodiments, methods may include: receiving a plurality of probe data points corresponding to a second road link upstream of the first road link upstream of the road link approaching the intersection; processing the probe data points corresponding to the second road link upstream of the first road link using a multi-modality detection and clustering algorithm to establish if multi-modality is present; in response to multi-modality being present, calculating a number of modes present and a speed ratio between a mode having a lowest average speed and a mode having a highest average speed; and grouping the second road link upstream of the first road link upstream of the road link approaching the intersection into the direction based traffic segment in response to the number of modes present in the second link corresponding to the number of modes in the first road link and the speed ratio of the second road link satisfying the predetermined value.

Providing route guidance relative to the intersection based on the lane-level traffic of the plurality of paths through the intersection may include providing route guidance along a first route to a destination. Methods may optionally include causing a route guidance change from the first path through the intersection of the first route to the second path through the intersection in response to an amount of time saved following the second path through the intersection relative to the first path through the intersection satisfying a predetermined amount of time; and recalculating the route to the destination incorporating the second path through the intersection.

Embodiments provided herein may include an apparatus. The apparatus may include: means for receiving a plurality of probe data points, each probe data point received from a probe apparatus of a plurality of probe apparatuses, each probe apparatus including one or more sensors and being onboard a respective vehicle, where each probe data point includes location information associated with the respective probe apparatus; means for determining a path through an intersection from among a plurality of paths through the intersection for each probe apparatus based, at least in part, on a sequence of probe data points from each respective probe apparatus; means for determining, for each path through the intersection, an average speed of probe apparatuses traveling along the respective path and an average travel time along a road link approaching the intersection of the probe apparatuses traveling along the respective path; means for calculating a differential amount of time between a highest average travel time along the road link approaching the intersection corresponding to a first path and a lowest average travel time along the road link approaching the intersection corresponding to a second path; means for determining a direction based traffic event in response to the differential amount of time between the highest average travel time and the lowest average travel time; means for publishing the direction based traffic event with lane-level traffic to users; and means for providing route guidance relative to the intersection based on the lane-level traffic of the plurality of paths through the intersection.

Embodiments provided herein may include a computer program product comprising at least one non-transitory memory having computer-executable program code instructions stored therein, the computer-executable program codes instructions comprising program code instructions for: receiving a plurality of probe data points, each probe data point received from a probe apparatus of a plurality of probe apparatuses, each probe apparatus including one or more sensors and being onboard a respective vehicle, where each probe data point includes location information associated with the respective probe apparatus; determining a path through an intersection from among a plurality of paths through the intersection for each probe apparatus based, at least in part, on a sequence of probe data points from each respective probe apparatus; determining, for each path through the intersection, an average speed of probe apparatuses traveling along the respective path and an average travel time along a road link approaching the intersection of the probe apparatuses traveling along the respective path; calculating a differential amount of time between a highest average travel time along the road link approaching the intersection corresponding to a first path and a lowest average travel time along the road link approaching the intersection corresponding to a second path; determining a direction based traffic event in response to the differential amount of time between the highest average travel time and the lowest average travel time; publishing the direction based traffic event with lane-level traffic to users; and providing route guidance relative to the intersection based on the lane-level traffic of the plurality of paths through the intersection.

BRIEF DESCRIPTION OF THE DRAWINGS

Figure 1:
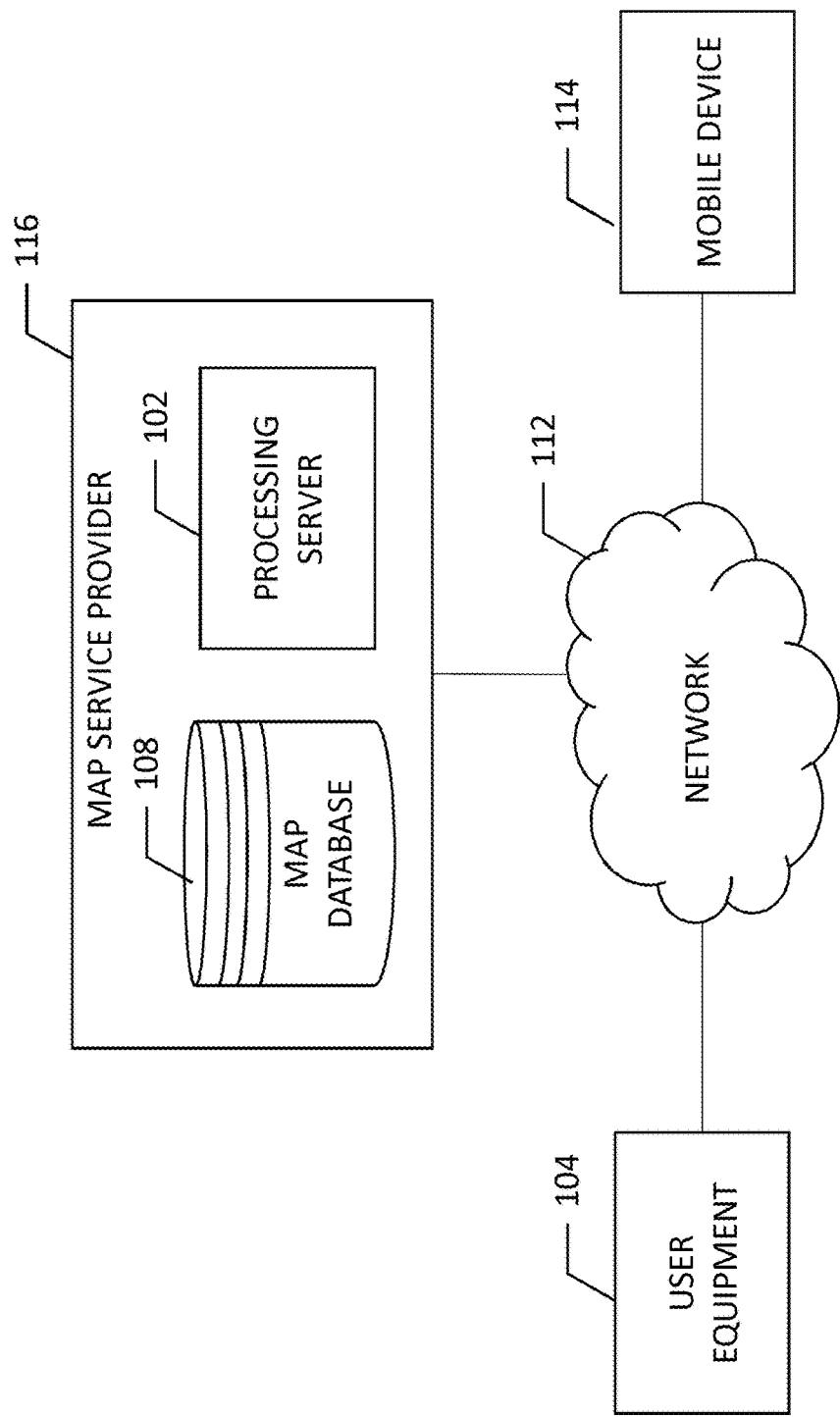
Figure 2:
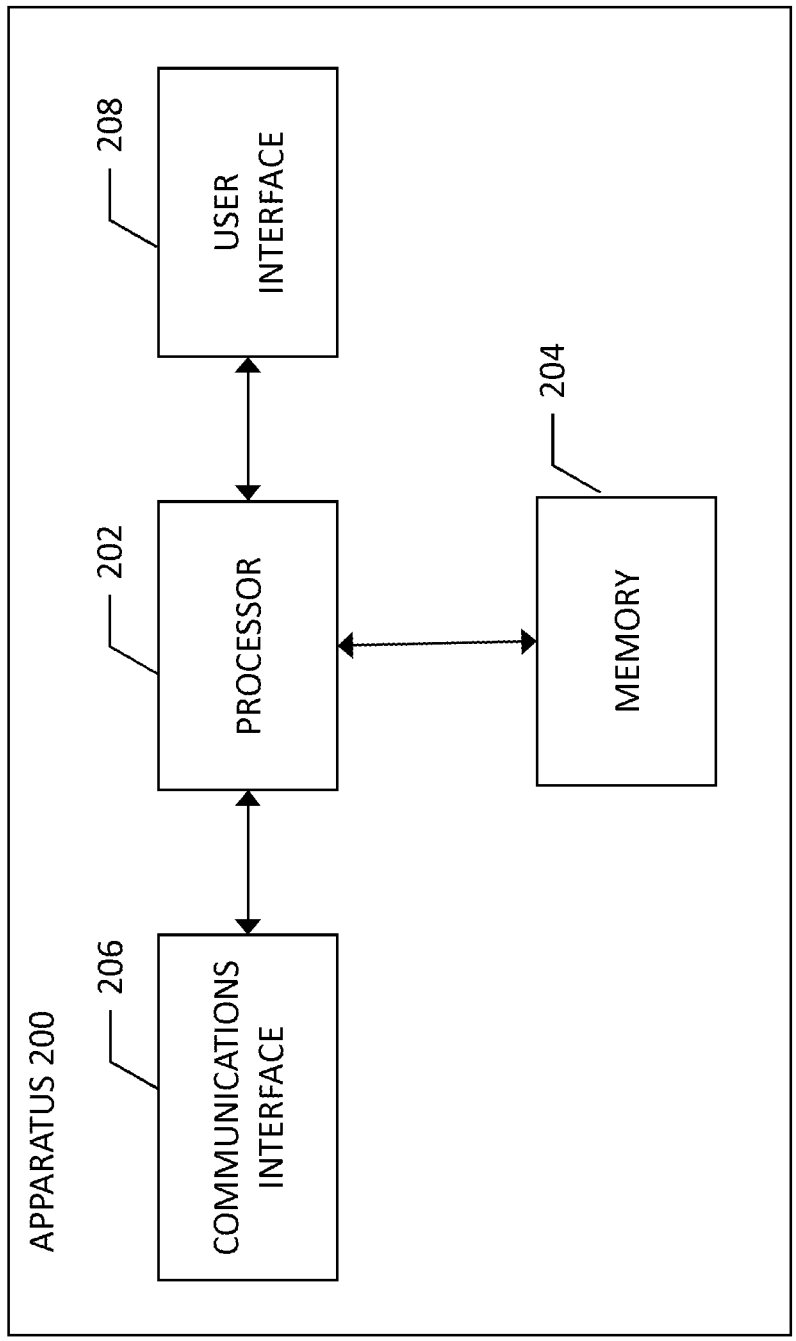
Figure 3:
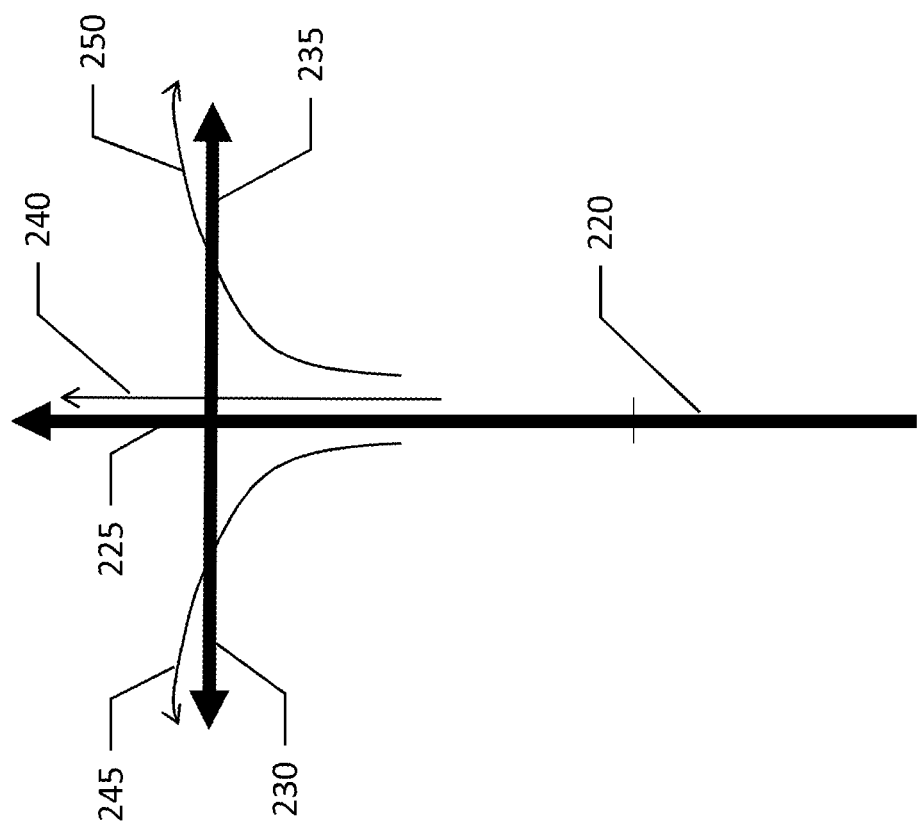
Figure 4:
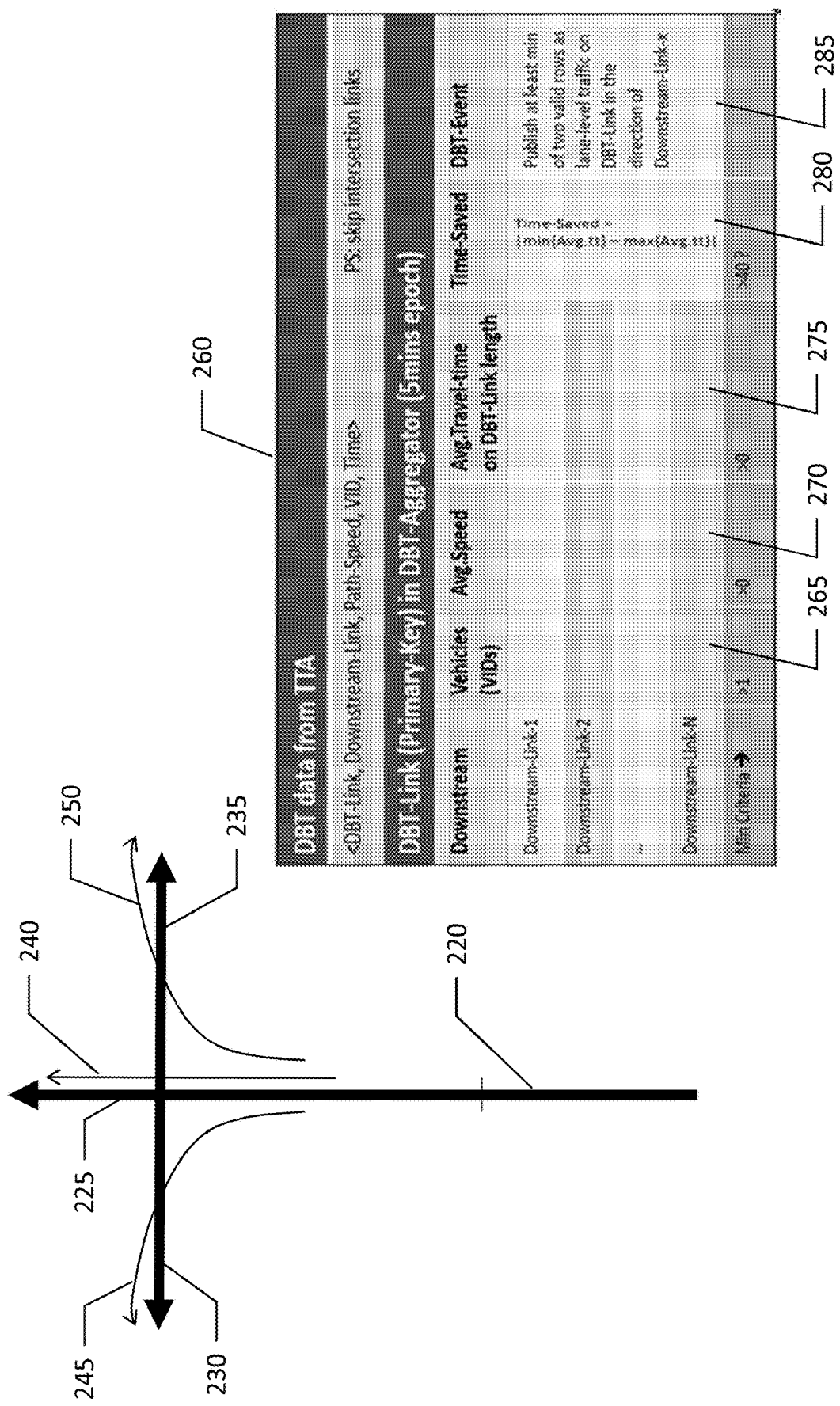
Figure 5:
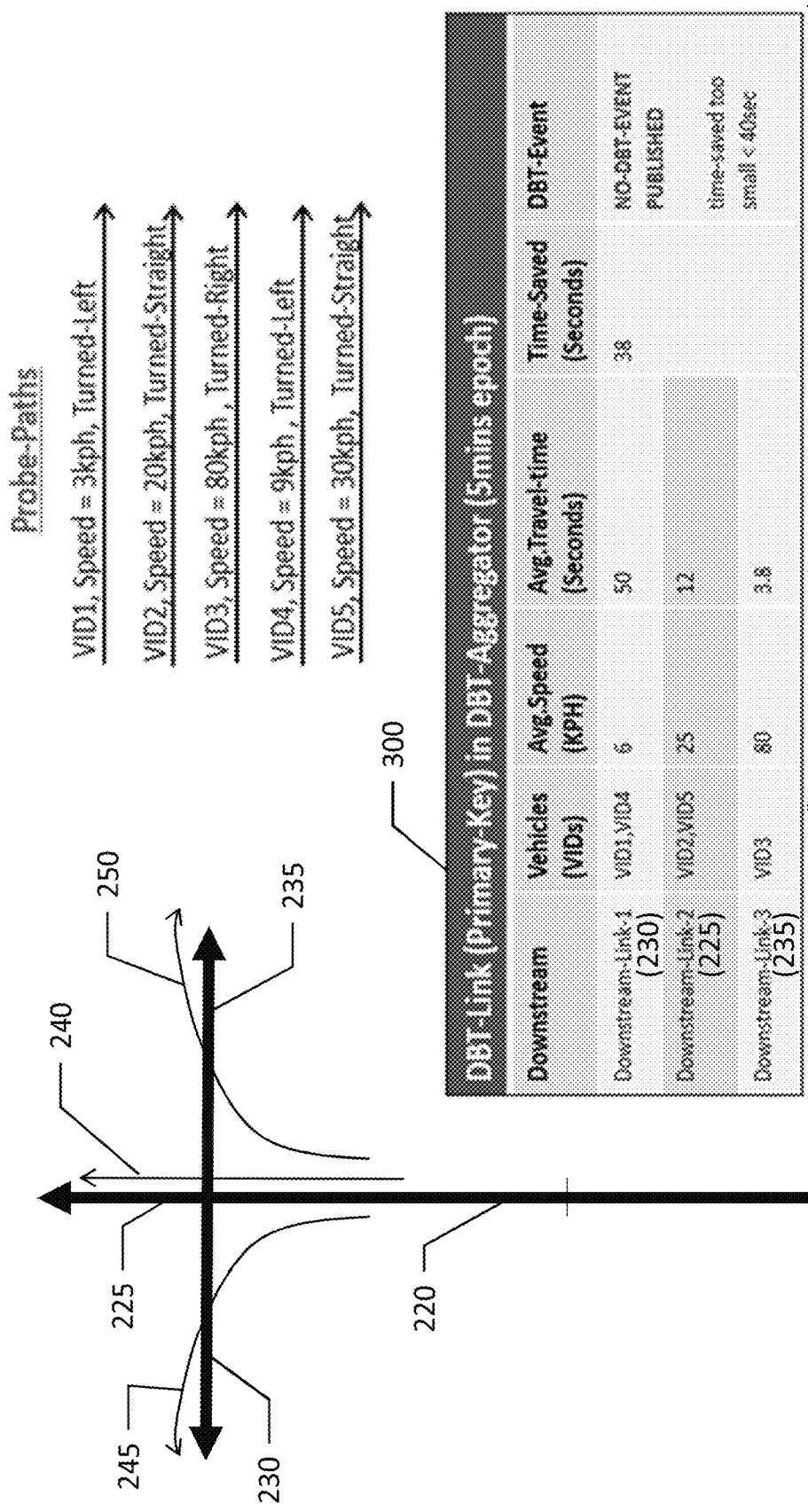
Figure 6:
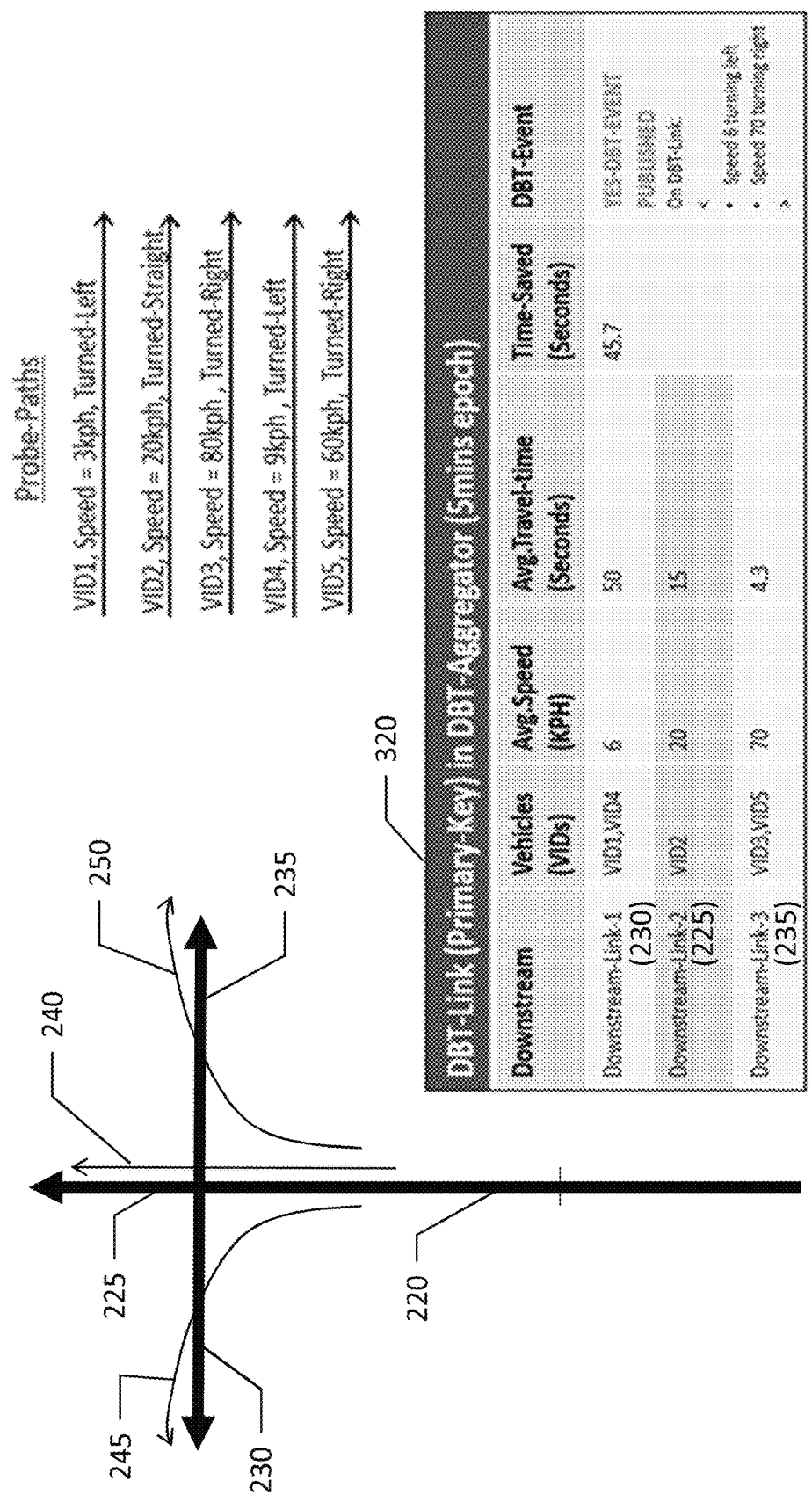
Figure 7:
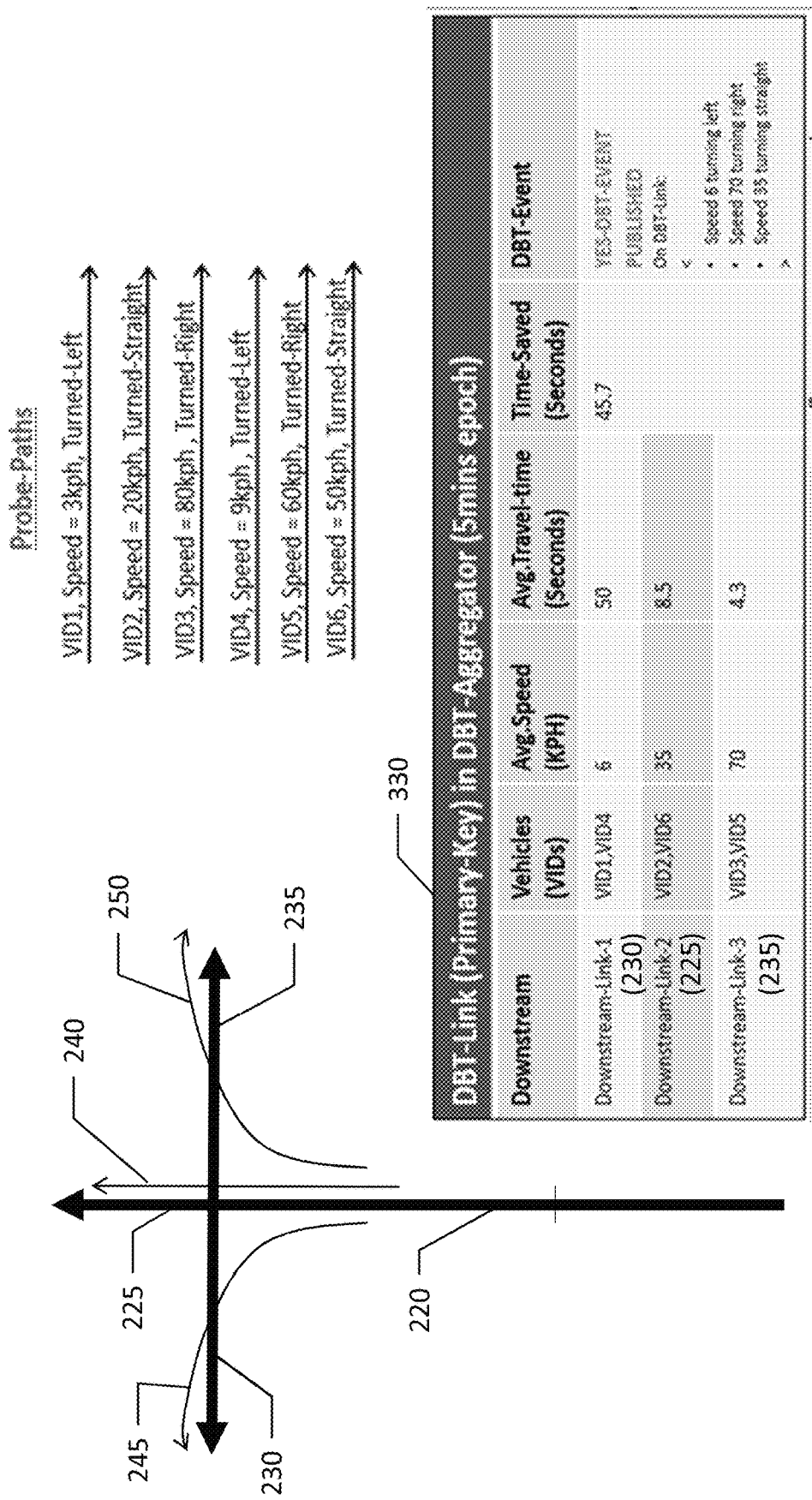
Figure 9:
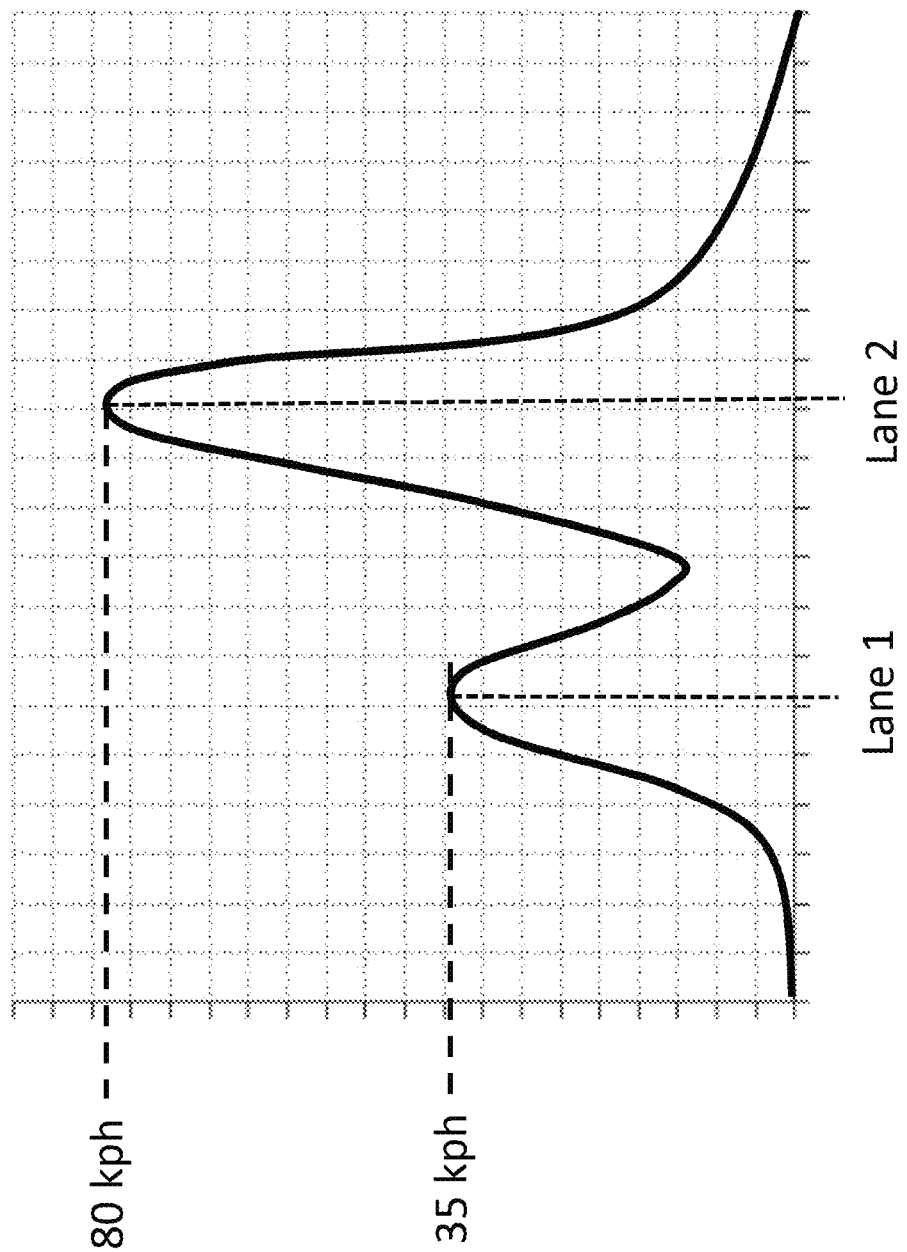
Figure 10:
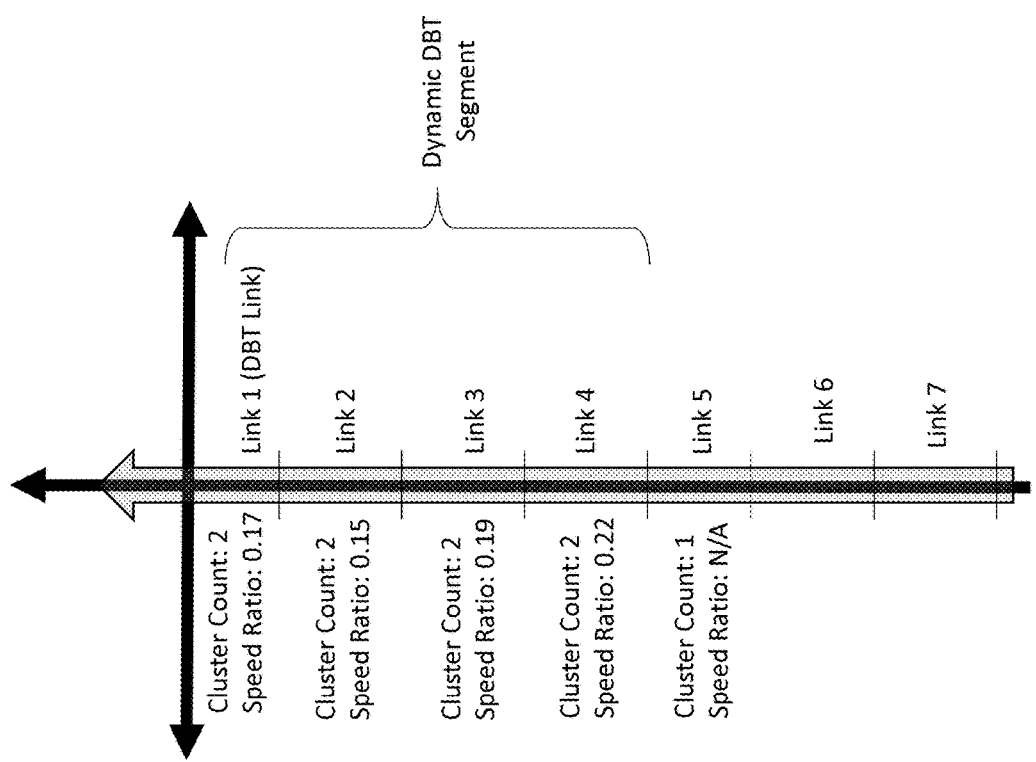
Figure 11:
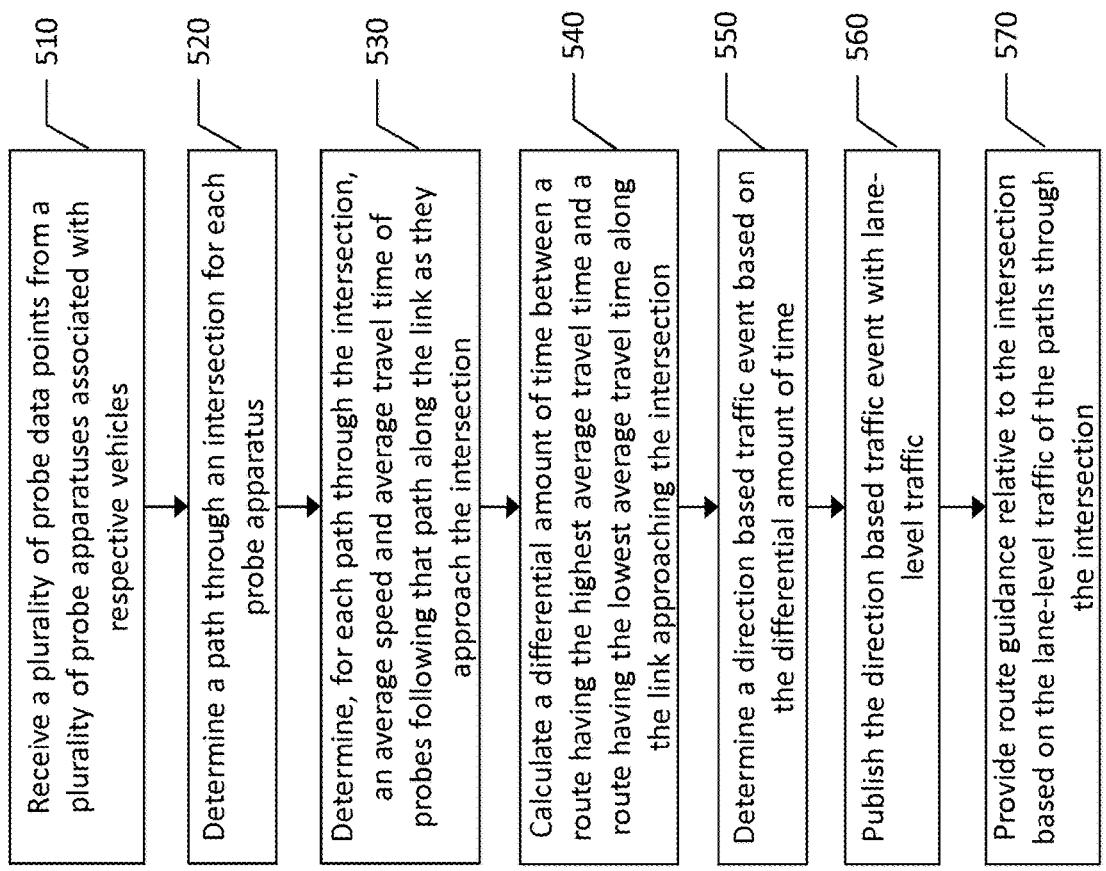

Having thus described example embodiments of the invention in general terms, reference will now be made to the accompanying drawings, which are not necessarily drawn to scale, and wherein:

FIG. 1 illustrates a communications diagram in accordance with an example embodiment;

FIG. 2 is a block diagram of an apparatus that may be specifically configured for establishing dynamic aggregation of arterial lane-level traffic speeds in accordance with an example embodiment described herein;

FIG. 3 illustrates an intersection of road links of a road network including paths through the intersection from an approaching road link according to an example embodiment described herein;

FIG. 4 illustrates the intersection of FIG. 3 along with a table depicting data fields relating to traffic flowing through the intersection according to an example embodiment described herein;

FIG. 5 illustrates the intersection and table of FIG. 4 including a sample data set representing vehicles having traversed the intersection according to an example embodiment described herein;

FIG. 6 illustrates the intersection and table of FIG. 4 including another sample data set representing vehicles having traversed the intersection according to another example embodiment described herein;

FIG. 7 illustrates the intersection and table of FIG. 4 including still another sample data set representing vehicles having traversed the intersection according to still another example embodiment described herein;

FIG. 8 depicts an example of a multi-modality and clustering algorithm according to an embodiment described herein;

FIG. 9 is a sample data set of data after processing with the multi-modality and clustering algorithm according to an example embodiment described herein;

FIG. 10 illustrates a dynamic direction based traffic event segment of a roadway established according to example embodiments described herein; and FIG. 11 is a flowchart of a method for analyzing vehicle data through an intersection, establishing a direction based traffic event, and determining how far upstream of the intersection the direction based traffic event begins according to an example embodiment described herein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for providing real-time traffic estimation at a lane-level granularity and for estimating the spatial convergence of an arterial lane-level traffic event or congestion incidence. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) also known as a context associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. Further, crowd-sourced data from vehicles traveling along the road links in the road network may provide information relating to their respective speed of travel, which may inform the map services provider with respect to traffic volumes and congestion. Such traffic congestion may be used during navigation or routing operations such that certain road links having traffic congestion may be avoided, particularly when the traffic congestion would cause a significant delay in a route while other routing options are available. Optionally, traffic congestion may be indicated to a user of the map service to inform the user of where traffic congestion exists, such that even if the user is not using routing to a destination, they may be able to avoid congested areas of the road network.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for efficient and effective route generation from an origin to a destination. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments of the present invention provide a mechanism for real-time traffic estimation at a lane-level of granularity and the ability to spatially converge road links attributable to arterial lane-level traffic events or congestion incidences. Map users have come to rely upon dynamic data relating to properties of a road network to inform them of routes to avoid and where travel may be delayed or problematic. Dynamic data relating to traffic congestion, road closures, or road obstructions may provide information to a user that will help inform them of a route to take to reach their destination. Users, including drivers of vehicles, autonomous or semi-autonomous vehicle controllers, road network monitoring systems, and navigation assistance systems seek real-time traffic information that provides accurate estimations of travel time between points and traffic information that indicates where problems on a road may occur, and what their impact is to travel along the road. Link-level traffic information provides information representative of all traffic on a link. However, understanding traffic information as it relates to various lanes of a road link and various paths through an intersection may be critical in evaluating estimated time of arrival or determining which route to take to reach a destination. Link-level traffic information may not be representative of the real travel-time condition of a route such that it may be beneficial for a navigation and routing system to understand if there is congestion along a route, and not just congestion on a road, that may impact the journey. Embodiments described herein may discern between the traffic conditions of different lanes of a road segment approaching an intersection and provide estimates of travel times along road segments and through intersections with greater accuracy than presently available.

Embodiments described herein provide real-time traffic estimation at lane-level granularity and provide a mechanism to estimate the spatial coverage of an arterial lane-level traffic event or congestion incidence. Traffic flow through an intersection may be inconsistent among lanes as different paths through the intersection may be affected by different downstream traffic issues. FIG. 3 illustrates a typical arterial intersection of road links that has a direction based traffic (DBT) link length 220 of three hundred meters (or less), a first downstream link 225 which proceeds straight from road link 220 through the intersection along path 240, a second downstream link 230 and a third downstream link 235 which proceed in directions substantially perpendicular to road link 220. The path to follow road link 230 from road link 220 is shown by arrow 245, while the path to follow road link 235 from road link 220 is shown by arrow 250. The paths are merely illustrative of the direction of turning through the intersection and do not represent an actual path followed by a vehicle proceeding through the intersection. As shown, for vehicles approaching the intersection along road link 220, there are three available paths for passing through the intersection—straight, right turn, and left turn. Embodiments described herein use the downstream direction of vehicle probes to ascertain if there is a significant difference in average travel speed for the different directions exiting the intersection. This process is referred to herein as Direction Based Traffic (DBT) which is used for the arterial lane-level traffic analysis to establish DBT events and DBT road segments as described further below.

Crowd-sourced vehicle probe data may generally be used to determine traffic levels at an intersection along the road links approaching the intersection. However, lane-level traffic levels approaching an intersection and the distance from the intersection at which the traffic congestion begins may be more difficult to determine. Embodiments described herein provide a mechanism to determine traffic congestion at an intersection on a lane-level of granularity along with an accurate measure of how far before the intersection the traffic congestion begins. Provided herein is an algorithm and technique that may be used to isolate a lane-level event from a complex network graph of arterial roads containing many intersections and estimating the spatial propagation of traffic events upstream of the source such that the impact on travel time for different routes and directions downstream may be accurately measured and used to provide improved route guidance and navigation.

Embodiments described herein use clustering inspection techniques to identify the propagation of a direction based traffic (DBT) event. FIG. 4 illustrates the basic data structure and algorithm logic to produce a DBT event on a DBT link. This method traces at least two vehicles (probes) in different downstream directions of the intersection and uses this to ascertain if there is a substantial difference in travel speeds of the vehicles to determine if there is a DBT event. As shown, data is received from vehicles in the form of probe data which includes at least a vehicle identifier (VID), a series of locations (i.e., a path), and times associated with each series of locations. The series of locations and times associated with each location may be used to establish a path speed, or a speed of the vehicle along the path through the intersection. Optionally, the probe data may include instantaneous speeds such that speeds at each location along the path may be known without calculating distance over time. The series of locations may be used, such as by map services provider 116, to establish a road link or series of road links along which the vehicle is traveling through a map matching method. This may provide information related to the probe data of a series of road links along which the vehicle traveled approaching the intersection, and the downstream links followed by the vehicle as it exited the intersection. This may be performed for a plurality of vehicles using their respective vehicle probe data. This data may be the DBT data shown in FIG. 4.

As shown in the table 260 of FIG. 4, the data may be aggregated, with each vehicle identification associated with a path through the intersection providing an entry into the table. The number of vehicles established based on unique vehicle identifiers may be tabulated in column 265. The table 260 represents only vehicles approaching the intersection along road link (DBT link) 220, such that each row represents a path through the intersection, such as a row representing a first downstream link 225, a row representing the second downstream link 230, etc. The vehicle identifiers corresponding with each path through the intersection are incremented in column 265, while the speed of those vehicles along each path are averaged in column 270. The average travel time on the length of the DBT link 220 is shown in column 275. This is tabulated based on the time and/or speed from the vehicle probe data along the respective path. Column 280 illustrates a single value for the "time saved" which is calculated based on the row having the minimum average travel time along the DBT link 220 and subtracting the row having the maximum average travel time along the DBT link 220. The table 260 may be calculated for an intersection along approaching road links in increments of time, such as in five-minute epochs as shown in FIG. 4. However, this may be done for any period of time suitable for a particular road link approaching an intersection. For example, in periods of wide variations in traffic levels happening relatively quickly, the epochs may be shortened, while for periods where traffic levels are relatively constant, epochs may be lengthened.

The table of FIG. 4 also illustrates that there are minimum criteria to be met for the data to be considered valid. For example, a single vehicle traveling along a path may not be representative of real-world driving along the path, such that the number of VIDs required for valid data may be greater than one. This minimum number may be varied based on the number of vehicles traversing a particular route or based on the class of roadway. For example, highways or primary roadways may require a higher minimum number of probe data paths to establish a trend based on the higher volume of traffic that generally flows along such roadways. Similarly, the time saved may be evaluated based on a minimum criteria, where a low amount of time saved may not merit re-routing or affecting the otherwise most desirable route taken by a user. As shown in FIG. 4, the minimum time saved may be forty seconds. This time may be varied based upon the total time of a route or based on other factors that may consider re-routing only when a minimum threshold of delay is considered. For example, in a route that takes thirty minutes, a forty second delay may be relatively insubstantial. However, in a five minute route, that delay may be considered more significant.

After producing the lane-level traffic on the DBT link 220 as shown in FIG. 4, embodiments described herein further evaluate the distance prior to the intersection at which traffic congestion begins. This evaluation may be used to establish the congestion for a first route while also establishing free flow information for another route, which may provide an improved mechanism for routing a user through an intersection with minimal delay and increasing the time saved based on the routing choices. Further, establishing a distance from the intersection at which traffic congestion begins and which routes through the intersection are affected may provide more granular and accurate estimated times of arrival (ETAs) to be obtained for navigation systems or personal navigation devices.

Embodiments described herein use a custom clustering algorithm that inspects the structure of vehicle probes on the DBT link and attempts to find similarities on the contiguous road links upstream of the DBT link until the probable length of the DBT event is established. This algorithm exploits the road network as a reference to determine the continuous links and an assurance that these links share similar traffic flow or road capacity that justifies the possibility of a propagation of the DBT event.

Raw probe data may be used for establishing DBT events from probe paths observed to have traversed an intersection. Using the different probe paths through the intersection, lane-level speeds on the DBT link may be established. The probe path data on the road links upstream of the DBT link are analyzed through multi-modality detection and clustering (MDC) to ascertain the statistical properties between the lanes and to compare those statistical properties against those of the DBT link such that similarities may be exploited and merged as one DBT event. If the statistical properties of the road links upstream of the DBT link differ from those of the DBT link, the upstream links are presumed to not be substantially affected by the same DBT event of the DBT link.

FIG. 5 illustrates an example embodiment of a Direction Based Traffic (DBT) event. In the illustrated embodiment, there are five different vehicles from which probe data is collected. Vehicles are represented by unique vehicle identifiers or "VID"s, such as VID1 through VID5. The paths taken by the vehicles are established based on the probe data map matched to paths through the intersection. The probe paths are shown in FIG. 5, such as VID1 having a speed of three kilometers per hour, and turning left from road link 220 onto road link 230, following path 245. Vehicle VID2 proceeded from road link 220 straight through the intersection to road link 225 at a speed of twenty kilometers per hour along path 240. The paths for VID3, VID4, and VID5 are similarly illustrated in FIG. 5. The table 300 shows the aggregated data from the vehicles. As shown, VID1 and VID4 both followed path 245, with an average speed of six kilometers per hour. The average travel time along link 220 was fifty seconds. For path 240 through the intersection, along road link 225, VID2 and VID5 averaged twenty-five kilometers per hour, and a time of twelve seconds along link 220. While vehicle VID3 traversed the road link 220 in only 3.8 seconds, averaging eighty kilometers per hour, since there was only a single vehicle, the data along path 250 may not yet be considered reliable. Thus, among the paths having valid data, namely, paths 245 and 240, the "time saved" is thirty eight seconds. In the illustrated table 260 of FIG. 4, the minimum threshold for time-saved is shown as forty seconds. As the time saved is below that predetermined amount of time, the "DBT Event" column illustrates that no DBT Event is acknowledged/published since the time savings are determined to not be substantial enough to merit such an event.

FIG. 6 illustrates another example embodiment of a plurality of vehicles approaching an intersection along road segment 220 and traversing the intersection, exiting on the different paths from the intersection. As shown, vehicles VID1 and VID4 both followed path 245, exiting the intersection along link 230, averaging a speed of six kilometers per hour and a travel time of fifty seconds. Path 240 through the intersection had only one vehicle travel along it, such that there is insufficient data to consider path 240 in the DBT event determination. Path 250 was traversed by vehicles VID3 and VID5, having an average speed of seventy kilometers per hour and a travel time average of 4.3 seconds. Thus, the time-saved is the difference between the fifty seconds of path 245 and the 4.3 seconds of path 250, a difference of 45.7 seconds as shown in table 320. As this amount is more than the forty second threshold, a DBT event is published as shown in the right-most column of table 320.

FIG. 7 illustrates yet another example embodiment of the analysis of a plurality of vehicles, VID1-VID6, approaching an intersection along road link 220 and exiting along links 225, 230, and 235. As shown, each path through the intersection—paths 240, 245, and 250, represented in the table 330 have two vehicles having traversed the respective path. Each of the paths, represented by the three rows of the table, have an average speed and an average travel time. As the average travel time along link 220 for following the path 245 along link 230 has the maximum average travel time of fifty seconds, and the average travel time along link 220 for following the path 250 along link 235 has the minimum average travel time of 4.3 seconds, the time saved remains 45.7 seconds as in the example embodiment of FIG. 3, and a DBT event is published as shown in the right-most column of table 330.

Once a DBT event is established, as in the example embodiments of FIGS. 6 and 7, embodiments described herein determine how far back from the intersection the DBT event extends along road segment 220. In order to do this, an algorithm is implemented to perform cluster analysis of all the links along link 220 leading up to the intersection. Real-time probe data is obtained for all the links along the traffic message channel (TMC) road segment associated with the link 220 where the DBT event is occurring. Lane-level traffic statistics are gathered from the probe data as illustrated above with respect to FIGS. 5-7. The multi-modality detection and clustering (MDC) algorithm may then be run on the probe data obtained for the DBT link where the DBT event is determined to be occurring to determine a number of speed clusters, or groups of probe data corresponding to multi-modal distribution across the road segment. This provides an indication of whether there are differences between speeds of vehicles traveling along the road segment. The MDC algorithm may then be run on the probe data points on the links upstream of the DBT link in a sequential manner, beginning at the link closest to the DBT link. The clusters of speeds for each subsequent road link is compared against the clusters of speeds for the DBT link as a method of statistical inspection. Applying the MDC algorithm to each road link progressing from the DBT link may end once an upstream link has clusters of speeds that are statistically distinct from that of the DBT link. Each road link having clusters of speeds that are not statistically distinct from that of the DBT link are aggregated into a single lane-level traffic event in which the lane-level speed for the dynamic segment is the same, or at least statistically similar, to the lane-level speed of the DBT link.

FIG. 8 depicts the pseudocode for the algorithm used to detect the multi-modality of the lane-level speeds. The end result of this algorithm is a set of discovered clusters of speeds representing multi-modality. In most cases, two clusters of speeds will be found; however, three clusters of speeds may also be possible. The speed clusters represent the different traffic flow paths through the intersection. FIG. 9 illustrates a multi-modal clustering of speeds representing two different lanes of a road link. The first cluster of Lane 1 averages thirty-five kilometers per hour, while the second cluster of Lane 2 averages eighty kilometers per hour. This clustering may be caused by one path through the intersection being slower than another. For example, a lane that turns left through the intersection may be slower as it may require yielding to oncoming traffic, while a straight and/or right-turn lane may proceed substantially unimpeded. As such, it is beneficial for a map services provider to understand which lanes are proceeding quickly, and which lanes are slowed. When there is a substantial difference, a Direction Based Traffic event is identified and analyzed to establish how far from the intersection it extends.

Various logical methods may be used to determine if a road link upstream of the DBT link is statistically similar to the DBT link. One such logical method is to establish a ratio between average speeds of the clusters identified through the MDC algorithm (FIG. 8), and identifying if the road links have the same or similar numbers of speed clusters. A cluster count criteria may be established based on the number of speed clusters of the DBT link after performing MDC analysis on the probe data from the DBT link. If the number of speed clusters is two, then upstream links may be required to have two speed clusters in order to be considered statistically similar to the DBT link. Further, a speed ratio criteria may be established. The speed ratio may be the average speed of the slowest speed cluster identified through the MDC algorithm divided by the average speed of the most free-flowing speed cluster identified through the MDC algorithm. For example, Table 1 below illustrates three links (Links 4, 5, and 6) with independent probe speeds that produce two clusters of speeds each after running the MDC algorithm on the probe data for each link. As shown, each of Links 4, 5, and 6 has a high-speed cluster and a low-speed cluster:

TABLE 1

Speed Clusters along Links

| Link | High Speed Cluster | Low Speed Cluster |
| --- | --- | --- |
| 4 | 55.857 | 10.454 |
| 5 | 59.272 | 13.104 |
| 6 | 60.769 | 15.114 |

As shown, presuming there are no additional speed clusters for any of links 4, 5, or 6, each one has two speed clusters such that they pass the cluster count test with respect to one another. Next, a ratio is established for each link, with link 4 having a speed ratio of 10.454/55.857, or 0.187. The ratio for link 5 is 13.104/59.272, or 0.221, while the ratio for link 6 is 15.114/60.769, or 0.249. If the cluster speed ratio threshold is set as 0.300, then each of the links 4, 5, and 6, would pass the cluster speed ratio test since they are each below 0.300. Thus, road links 4, 5, and 6 can be aggregated and grouped into the DBT event. However, if the speed ratio test was 0.240, road link 6 would fail to pass the cluster speed ratio test, and only links 4 and 5 would be aggregated and grouped together, while road links beyond link 6 would not be analyzed, as the continuity does not extend past link 5.

FIG. 10 illustrates an example embodiment of a dynamic DBT segment including a plurality of links beginning with the DBT link, Link 1. Once a DBT event is established at Link 1, analysis of subsequent links begins at Link 2, where the MDC algorithm is applied to probe data from Link 2, and the results of the MDC algorithm are analyzed. In the illustrated embodiment, the speed ratio threshold may be established as 0.25, and the DBT link (Link 1) has a cluster count of two. As shown, Link 2 passes both the cluster speed ratio test (0.15<0.25) and the cluster count test (2=2). Similarly, Links 3 and 4 also pass both of these tests. However, application of the MDC algorithm to the probe data of Link 5 does not result in a multi-modal distribution, such that the cluster count is only one, and thus the cluster count test is not passed. Further, as there is only one speed cluster, there is no speed ratio calculated. The analysis of probe data of Links 6 and 7 is unnecessary as Link 5 created a discontinuity. However, Links 1 through 4 may be grouped together into a DBT segment, where the DBT event of Link 1 extends back to Link 4.

Once the DBT segment is established as detailed above, it may be published via map service provider 116 of FIG. 1 with lane level traffic and provided to users. The DBT segment may then be used, such as by a navigation system or by user equipment 104, in route guidance and navigation to direct users along the most efficient path to their destination or to allow users to see traffic issues and avoid them as appropriate.

FIG. 11 illustrates a flowchart depicting a method according to example embodiments of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems that perform the specified functions, or combinations of special purpose hardware and computer instructions.

FIG. 11 illustrates a flowchart of a method according to an example embodiment of the present invention for establishing a direction based traffic event at an intersection based on a plurality of paths through the intersection. As shown, a plurality of probe data points are received from a plurality of probe apparatuses, each associated with a respective vehicle at 510. For each probe apparatus, a path through the intersection is determined at 520. For each path through the intersection, an average speed and travel time of probes following the respective path are determined at 530. At 540, a differential amount of time is calculated between a route having the highest average travel time and a route having the lowest average travel time along the link approaching the intersection. Based on the differential amount of time, a direction based traffic event is determined at 550. The direction based traffic event is published at 560 along with lane-level traffic based on the paths through the intersection. At 570, route guidance is provided relative to the intersection based on the lane-level traffic of the paths through the intersection.

In an example embodiment, an apparatus for performing the method of FIG. 11 above may comprise a processor (e.g., the processor 202) configured to perform some or each of the operations (510-570) described above. The processor may, for example, be configured to perform the operations (510-

570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
   a memory comprising map data; and
   processing circuitry configured to:
   receive a plurality of probe data points, each probe data point received from a probe apparatus of a plurality of probe apparatuses, each probe apparatus comprising one or more sensors and being onboard a respective vehicle, wherein each probe data point comprises location information associated with the respective probe apparatus;
   determine a path through an intersection from among a plurality of paths through the intersection for each probe apparatus based, at least in part, on a sequence of probe data points from each respective probe apparatus;
   determine, for each path through the intersection, an average speed of probe apparatuses traveling along the respective path and an average travel time along a road link approaching the intersection of the probe apparatuses traveling along the respective path;
   calculate a differential amount of time between a highest average travel time along the road link approaching the intersection corresponding to a first path and a lowest average travel time along the road link approaching the intersection corresponding to a second path;
   determine a direction based traffic event in response to the differential amount of time between the highest average travel time and the lowest average travel time;
   publish the direction based traffic event with lane-level traffic to users of the mapping system; and
   provide route guidance relative to the intersection based on the lane-level traffic of the plurality of paths through the intersection.

2. The mapping system of claim 1, wherein the processing circuitry configured to determine a direction based traffic event in response to the differential amount of time between the highest average travel time and the lowest average travel time comprises processing circuitry configured to:
   determine a direction based traffic event in response to the differential amount of time between the highest average travel time and the lowest average travel time satisfying a predetermined value.

3. The mapping system of claim 1, wherein the processing circuitry is further configured to:
   receive a plurality of probe data points corresponding to a first road link upstream of the road link approaching the intersection;
   process the probe data points corresponding to the first road link upstream of the road link approaching the intersection using a multi-modality detection and clustering algorithm to establish if multi-modality is present; and
   in response to multi-modality being present, calculating a number of modes present and a speed ratio between a mode having a lowest average speed and a mode having a highest average speed.

4. The mapping system of claim 3, wherein in response to the number of modes present corresponding to a number of modes in the probe data points along the road link approaching the intersection, and the speed ratio satisfying a predetermined criteria, the processing circuitry is further configured to group the first road link upstream of the road link approaching the intersection with the road link approaching the intersection into a direction based traffic segment where lane-level traffic along the direction based traffic segment is estimated to be consistent.

5. The mapping system of claim 4, wherein the processing circuitry is further configured to:
   receive a plurality of probe data points corresponding to a second road link upstream of the first road link upstream of the road link approaching the intersection;
   process the probe data points corresponding to the second road link upstream of the first road link using a multi-modality detection and clustering algorithm to establish if multi-modality is present; and
   in response to multi-modality being present, calculate a number of modes present and a speed ratio between a mode having the lowest average speed and a mode having the highest average speed.

6. The mapping system of claim 5, wherein in response to the number of modes present in the second road link corresponding to the number of modes in the probe data points along the road link approaching the intersection, and the speed ratio of the second road link satisfying the predetermined criteria, the processing circuitry is further configured to group the second road link upstream of the first road link upstream of the road link approaching the intersection with first road link upstream of the road link approaching the intersection and the road link approaching the intersection into the direction based traffic segment.

7. The mapping system of claim 1, wherein the processing circuitry is configured to provide route guidance relative to the intersection based on the lane-level traffic of the plurality of paths through the intersection by providing route guidance along a first route to a destination, and wherein the processing circuitry is further configured to:
   cause a route guidance change from the first path through the intersection of the first route to the second path through the intersection in response to an amount of time saved following the second path through the intersection relative to the first path through the intersection satisfying a predetermined amount of time; and
recalculate the route to the destination incorporating the second path through the intersection.

8. An apparatus comprising at least one processor and at least one memory including computer program code, the at least one memory and computer program code configured to, with the processor, cause the apparatus to at least:
receive a plurality of probe data points, each probe data point received from a probe apparatus of a plurality of probe apparatuses, each probe apparatus comprising one or more sensors and being onboard a respective vehicle, wherein each probe data point comprises location information associated with the respective probe apparatus;
determine a path through an intersection from among a plurality of paths through the intersection for each probe apparatus based, at least in part, on a sequence of probe data points from each respective probe apparatus;
determine, for each path through the intersection, an average speed of probe apparatuses traveling along the respective path and an average travel time along a road link approaching the intersection of the probe apparatuses traveling along the respective path;
calculate a differential amount of time between a highest average travel time along the road link approaching the intersection corresponding to a first path and a lowest average travel time along the road link approaching the intersection corresponding to a second path;
determine a direction based traffic event in response to the differential amount of time between the highest average travel time and the lowest average travel time;
publish the direction based traffic event with lane-level traffic to users; and
provide route guidance relative to the intersection based on the lane-level traffic of the plurality of paths through the intersection.

9. The apparatus of claim 8, wherein causing the apparatus to determine a direction based traffic event in response to the differential amount of time between the highest average travel time and the lowest average travel time comprises causing the apparatus to:
determine a direction based traffic event in response to the differential amount of time between the highest average travel time and the lowest average travel time satisfying a predetermined value.

10. The apparatus of claim 8, wherein the apparatus is further caused to:
receive a plurality of probe data points corresponding to a first road link upstream of the road link approaching the intersection;
process the probe data points corresponding to the first road link upstream of the road link approaching the intersection using a multi-modality detection and clustering algorithm to establish if multi-modality is present; and
in response to multi-modality being present, calculate a number of modes present and a speed ratio between a mode having a lowest average speed and a mode having a highest average speed.

11. The apparatus of claim 10, wherein in response to the number of modes present corresponding to a number of modes in the probe data points along the road link approaching the intersection, and the speed ratio satisfying a predetermined criteria, the apparatus is further caused to group the first road link upstream of the road link approaching the intersection with the road link approaching the intersection into a direction based traffic segment where lane-level traffic along the direction based traffic segment is estimated to be consistent.

12. The apparatus of claim 11, wherein the apparatus is further caused to:
receive a plurality of probe data points corresponding to a second road link upstream of the first road link upstream of the road link approaching the intersection;
process the probe data points corresponding to the second road link upstream of the first road link using a multi-modality detection and clustering algorithm to establish if multi-modality is present; and
in response to multi-modality being present, calculate a number of modes present and a speed ratio between a mode having the lowest average speed and a mode having the highest average speed of the second road link.

13. The apparatus of claim 12, wherein in response to the number of modes present in the second road link corresponding to the number of modes in the probe data points along the road link approaching the intersection, and the speed ratio of the second road link satisfying the predetermined criteria, the apparatus is further caused to group the second road link upstream of the first road link upstream of the road link approaching the intersection with first road link upstream of the road link approaching the intersection and the road link approaching the intersection into the direction based traffic segment.

14. The apparatus of claim 8, wherein the apparatus is caused to provide route guidance relative to the intersection based on the lane-level traffic of the plurality of paths through the intersection by providing route guidance along a first route to a destination, and wherein the apparatus is further caused to:
cause a route guidance change from the first path through the intersection of the first route to the second path through the intersection in response to an amount of time saved following the second path through the intersection relative to the first path through the intersection satisfying a predetermined amount of time; and
recalculate the route to the destination incorporating the second path through the intersection.

15. A method comprising:
receiving a plurality of probe data points, each probe data point received from a probe apparatus of a plurality of probe apparatuses, each probe apparatus comprising one or more sensors and being onboard a respective vehicle, wherein each probe data point comprises location information associated with the respective probe apparatus;
determining a path through an intersection from among a plurality of paths through the intersection for each probe apparatus based, at least in part, on a sequence of probe data points from each respective probe apparatus;
determining, for each path through the intersection, an average speed of probe apparatuses traveling along the respective path and an average travel time along a road link approaching the intersection of the probe apparatuses traveling along the respective path;
calculating a differential amount of time between a highest average travel time along the road link approaching the intersection corresponding to a first path and a lowest average travel time along the road link approaching the intersection corresponding to a second path;

determining a direction based traffic event in response to the differential amount of time between the highest average travel time and the lowest average travel time;

publishing the direction based traffic event with lane-level traffic to users; and providing route guidance relative to the intersection based on the lane-level traffic of the plurality of paths through the intersection.

16. The method of claim 15, wherein determining a direction based traffic event in response to the differential amount of time between the highest average travel time and the lowest average travel time comprises:

determining a direction based traffic event in response to the differential amount of time between the highest average travel time and the lowest average travel time satisfying a predetermined value.

17. The method of claim 15, further comprising:

receiving a plurality of probe data points corresponding to a first road link upstream of the road link approaching the intersection;

processing the probe data points corresponding to the first road link upstream of the road link approaching the intersection using a multi-modality detection and clustering algorithm to establish if multi-modality is present; and in response to multi-modality being present, calculating a number of modes present and a speed ratio between a mode having the lowest average speed and a mode having the highest average speed.

18. The method of claim 17, wherein in response to the number of modes present in the first road link corresponding to a number of modes in the probe data points along the road link approaching the intersection, and the speed ratio satisfying a predetermined criteria, the method further comprises grouping the first road link upstream of the road link approaching the intersection with the road link approaching the intersection into a direction based traffic segment where lane-level traffic along the direction based traffic segment is estimated to be consistent.

19. The method of claim 18, further comprising:

receiving a plurality of probe data points corresponding to a second road link upstream of the first road link upstream of the road link approaching the intersection;

processing the probe data points corresponding to the second road link upstream of the first road link using a multi-modality detection and clustering algorithm to establish if multi-modality is present;

in response to multi-modality being present, calculating a number of modes present and a speed ratio between a mode having a lowest average speed and a mode having a highest average speed; and grouping the second road link upstream of the first road link upstream of the road link approaching the intersection into the direction based traffic segment in response to the number of modes present in the second road link corresponding to the number of modes in the first road link and the speed ratio of the second road link satisfying the predetermined criteria.

20. The method of claim 15, wherein providing route guidance relative to the intersection based on the lane-level traffic of the plurality of paths through the intersection comprises providing route guidance along a first route to a destination, the method further comprising:

causing a route guidance change from the first path through the intersection of the first route to the second path through the intersection in response to an amount of time saved following the second path through the intersection relative to the first path through the intersection satisfying a predetermined amount of time; and recalculating the route to the destination incorporating the second path through the intersection.

* * * * *